United States Patent
Jang et al.

(10) Patent No.: US 8,538,073 B2
(45) Date of Patent: Sep. 17, 2013

(54) IMAGE PROCESSING APPARATUS AND METHOD FOR TRACKING A LOCATION OF A TARGET SUBJECT

(75) Inventors: Soon-geun Jang, Suwon-si (KR); Eun-sun Ahn, Suwon-si (KR)

(73) Assignee: Samsung Electroncis Co., Ltd., Suwon-Si (KR)

( * ) Notice: Subject to any disclaimer, the term of this patent is extended or adjusted under 35 U.S.C. 154(b) by 932 days.

(21) Appl. No.: 12/622,620

(22) Filed: Nov. 20, 2009

(65) Prior Publication Data

US 2010/0128929 A1  May 27, 2010

(30) Foreign Application Priority Data

Nov. 21, 2008  (KR) .......................... 10-2008-0116370

(51) Int. Cl.
   *G06K 9/00*  (2006.01)
(52) U.S. Cl.
   USPC .......................................................... 382/103
(58) Field of Classification Search
   USPC ................ 382/103, 104, 105, 106, 107, 108,
        382/232, 233, 234, 235, 236, 237, 238, 239,
        382/240, 241, 242, 243, 244, 245, 246, 247,
        382/248, 249, 250, 251, 252; 348/14.1, 97,
        348/143, 144, 145, 146, 147, 148, 149, 150,
        348/151, 52, 153, 154, 208.1, 208.2, 208.3,
        348/208.4, 208.14, 208.16, 220.1, 335, 336,
        348/345, 352, 402.1, 407.1, 413.1, 416.1,
        348/431.1, 441, 451, 452, 699, 700
   See application file for complete search history.

(56) References Cited

U.S. PATENT DOCUMENTS

| 5,815,602 | A  | * | 9/1998  | Ueda et al. ..................... 382/236 |
| 7,142,600 | B1 | * | 11/2006 | Schonfeld et al. ........ 375/240.16 |
| 7,783,118 | B2 | * | 8/2010  | Zhou ............................. 382/236 |
| 8,107,748 | B2 | * | 1/2012  | Miao et al. ..................... 382/236 |
| 8,199,805 | B2 | * | 6/2012  | Numata et al. ................ 375/240 |
| 8,295,543 | B2 | * | 10/2012 | Tu et al. ........................ 382/103 |
| 2003/0235327 | A1 | * | 12/2003 | Srinivasa ...................... 382/104 |
| 2004/0167671 | A1 | * | 8/2004  | Aoyama ....................... 700/259 |
| 2007/0064803 | A1 | * | 3/2007  | Miao et al. ............... 375/240.16 |
| 2009/0161763 | A1 | * | 6/2009  | Rossignol et al. ........ 375/240.16 |
| 2010/0128929 | A1 | * | 5/2010  | Jang et al. .................... 382/103 |
| 2010/0201853 | A1 | * | 8/2010  | Ishiga .......................... 348/280 |

OTHER PUBLICATIONS

Viola et al., "Alignment by Maximization of Mutual Information," Fifth International Conference on Computer Vision, 1995, Proceedings., IEEE, pp. 16-23 (1995).

* cited by examiner

*Primary Examiner* — Bhavesh Mehta
*Assistant Examiner* — Tahmina Ansari
(74) *Attorney, Agent, or Firm* — Drinker Biddle & Reath LLP

(57) ABSTRACT

A digital image processing apparatus has a tracking function for tracking a location variation of a set tracking area on a plurality of frame images. The digital image processing apparatus includes a similarity calculation unit that calculates a similarity by varying a location of a template on one frame image. The similarity calculation unit calculates a second direction similarity by fixing a first direction location of the template in a first direction on the one frame image and by varying a second direction location of the template in a second direction which is perpendicular to the first direction, and then calculates a first direction similarity by fixing the second direction location of the template at a location where the second direction similarity is the highest and by varying the first direction location of the template in the first direction on the one frame image.

22 Claims, 9 Drawing Sheets

IMAGE PROCESSING APPARATUS AND METHOD FOR TRACKING A LOCATION OF A TARGET SUBJECT

CROSS-REFERENCE TO RELATED PATENT APPLICATION

This application claims the priority benefit of Korean Patent Application No. 10-2008-0116370, filed on Nov. 21, 2008, in the Korean Intellectual Property Office, the disclosure of which is incorporated herein in its entirety by reference.

BACKGROUND

1. Field of the Invention

The present invention relates to an image processing apparatus and method, and more particularly, to an image processing apparatus and method capable of rapidly and accurately tracking a location of a certain target subject on a video image.

2. Description of the Related Art

In general, a digital image processing apparatus displays a video image on a display unit by using data of a video file stored in a recording medium. In particular, a digital photographing apparatus that is a type of digital image processing apparatus displays a video image on a display unit or stores a video file in a recording medium by using data obtained from light that is incident on an imaging device.

One function of the digital photographing apparatus is a tracking function for tracking a certain target subject on a video image. The tracking function is performed by determining a portion of a frame image, which is most similar to a template (reference image) that is smaller than the frame image, as a tracking area. Here, a template is an image including the whole or a portion of the target subject to be tracked.

FIG. 1 is a conceptual view for describing a tracking method of a conventional digital image processing apparatus.

Referring to FIG. 1, a template T is compared to each of a plurality of portions of one frame image Im a plurality of times.

For example, if the one frame image Im has a size of 320×240 and the template T has a size of 80×60, the one frame image Im may be divided into 43621 sub-images (43621.241×181) each having the same size as the template T. A sub-image most similar to the template T is found from among the sub-images on the one frame image Im and a portion corresponding to the most similar sub-image is determined as a tracking area. Thus, if the one frame image Im has a size of 320×240 and the template T has a size of 80×60, a similarity calculation should be performed a total of 43621 times between the template T and the sub-images in order to determine the tracking area on the one frame image Im.

If 30 frame images are displayed in 1 second, a time for displaying one frame image on a display unit is 33 msec., and thus the similarity calculation should be performed 43621 times in 33 msec. Accordingly, a specification of hardware of the digital image processing apparatus should be greatly increased in order to perform such a huge amount of calculations in such a short time, which necessarily causes a problem of, for example, high manufacturing costs.

SUMMARY

Embodiments of the present invention include an image processing apparatus and method capable of rapidly and accurately tracking a location of a certain target subject on a video image, and a computer-readable storage medium having stored thereon a program executable by a processor for performing the method.

According to an aspect of the present invention, a digital image processing apparatus has a tracking function for tracking a location variation of a set tracking area on a plurality of frame images. The apparatus includes a similarity calculation unit having a frame image input, a template input, and a similarity output. The similarity calculation unit is configured to calculate the similarity output by varying a location of an input template on one input frame image, wherein the similarity calculation unit calculates a second direction similarity by fixing a first direction location of the template in a first direction on the one frame image and by varying a second direction location of the template in a second direction which is perpendicular to the first direction, and then calculates a first direction similarity by fixing the second direction location of the template at a location where the second direction similarity is the highest and by varying the first direction location of the template in the first direction on the one frame image. The similarity calculation unit outputs the first direction similarity and the second direction similarity via the similarity output.

The template on the one frame image may be a tracking area set on a previous frame image.

When the second direction similarity is calculated, the similarity calculation unit may regard a location or a neighboring location of the tracking area set on the previous frame image, in the first direction, as the first direction location of the template in the first direction.

The apparatus may further include a tracking area determination unit having a similarity input and a tracking area output. The tracking area determination unit may be configured to determine a portion of the one frame image which is most similar to the template as the tracking area based on a calculation result of the similarity calculation unit received via the similarity input, and output the determined portion as the tracking area.

The tracking area determination unit may determine a location where the first direction similarity is the highest as a location of the tracking area on the one frame image.

The tracking area may be the same size as the template.

After the second direction similarity and the first direction similarity are calculated, the similarity calculation unit may re-calculates the second direction similarity by fixing the first direction location of the template at a location where the first direction similarity is the highest and by varying the second direction location of the template in the second direction on the one frame image.

After the second direction similarity is re-calculated, the similarity calculation unit may re-calculate the first direction similarity by fixing the second direction location of the template at a location where the re-calculated second direction similarity is the highest and by varying the first direction location of the template in the first direction on the one frame image.

The similarity calculation unit may repeatedly calculate the second direction similarity and the first direction similarity a plurality of times.

The first direction may be one of horizontal and vertical directions and the second direction may be the other of the horizontal and vertical directions.

According to another aspect of the present invention, a method of controlling a digital image processing apparatus may include (a) calculating a second direction similarity by regarding a tracking area set on a previous frame image as a template on a current frame image, regarding a location or a neighboring location of the tracking area in a first direction on the previous frame image as a first direction location of the template in the first direction, fixing the first direction location of the template, and varying a second direction location of the template in a second direction which is perpendicular to the first direction. The method may also include (b) calculating a first direction similarity by fixing the second direction location of the template at a location where the second direction similarity is the highest, which is determined in (a), and by varying the first direction location of the template in the first direction on the current frame image.

The method may further include (c) determining a location where the first direction similarity is the highest, which is determined in (b), as a location of the tracking area on the current frame image.

The method may further include (c) re-calculating the second direction similarity by fixing the first direction location of the template at a location where the first direction similarity is the highest, which is determined in (b), and by varying the second direction location of the template in the second direction on the current frame image.

The method may further include (d) determining a location where the second direction similarity is the highest, which is determined in (c), as a location of the tracking area on the current frame image.

The method may further include (d) re-calculating the first direction similarity by fixing the second direction location of the template at a location where the second direction similarity is the highest, which is determined in (c), and by varying the first direction location of the template in the first direction on the current frame image.

The method may further include (e) determining a location where the first direction similarity is the highest, which is determined in (d), as a location of the tracking area on the current frame image.

The tracking area may be the same size as the template.

The first direction may be one of horizontal and vertical directions and the second direction may be the other of the horizontal and vertical directions.

According to another aspect of the present invention, a computer-readable storage medium may have stored thereon a program executable by a processor for performing the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, the present invention will be described in detail by explaining embodiments of the invention with reference to the attached drawings.

Figure 2:
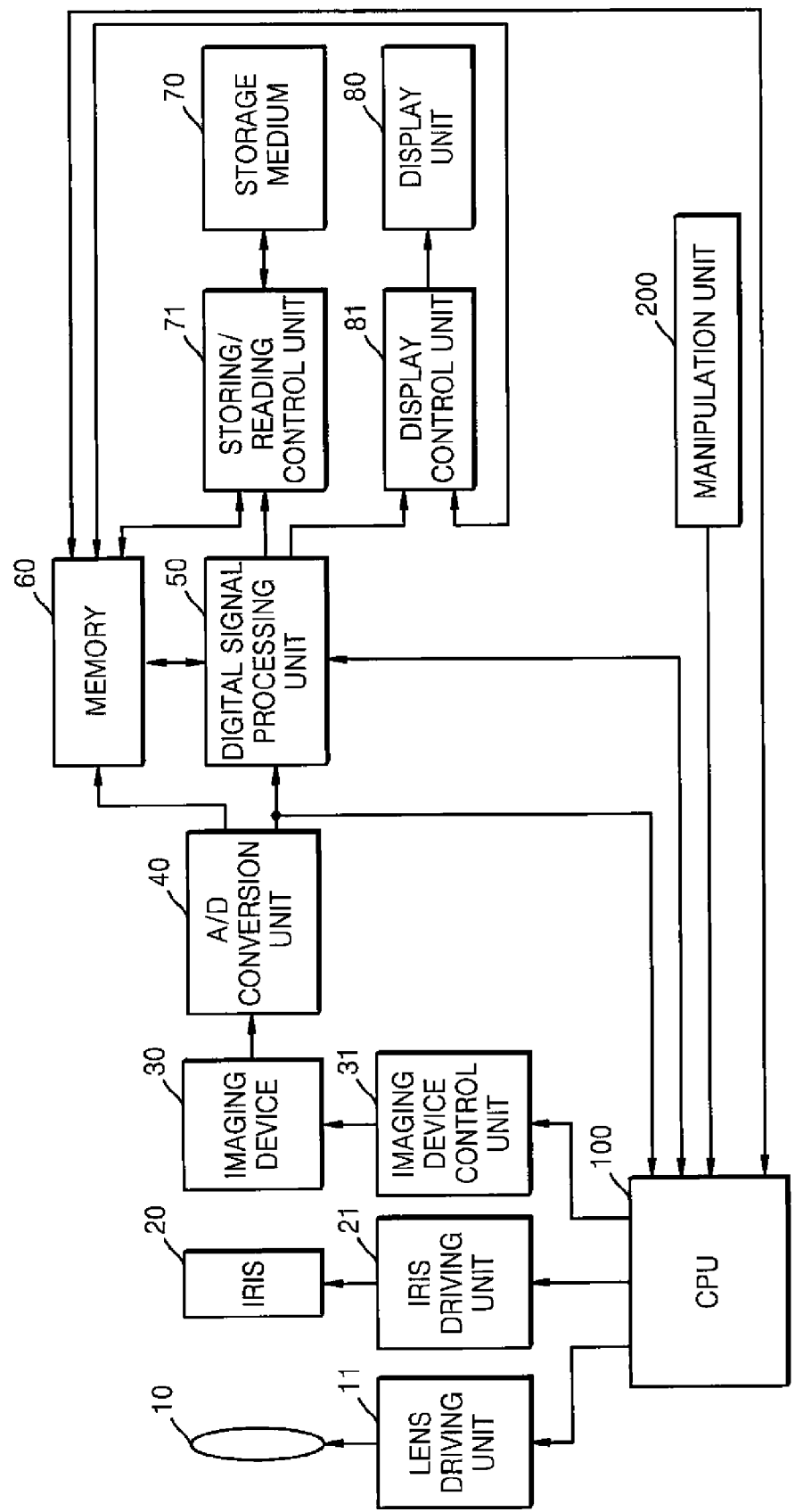
FIG. 2 is a block diagram of a digital image processing apparatus according to an embodiment of the present invention.
Figure 3:
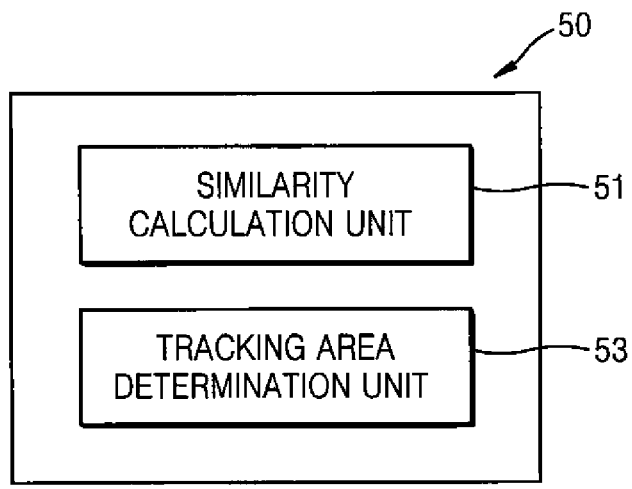
FIG. 3 is a block diagram of a portion of the digital image processing apparatus illustrated in FIG. 2.

FIG. 2 is a block diagram of a digital image processing apparatus according to an embodiment of the present invention. FIG. 3 is a block diagram of a portion of the digital image processing apparatus illustrated in FIG. 2. In particular, FIG. 2 illustrates a digital photographing apparatus as a type of digital image processing apparatus. However, the present invention is not limited to the digital photographing apparatus illustrated in FIG. 2 and may also be applied to image processing apparatuses such as a personal digital assistant (PDA) and a personal multimedia player (PMP). The same principle will be applied to other embodiments to be described later.

Referring to FIG. 2, general operation of the digital photographing apparatus is managed by a CPU 100. The digital photographing apparatus includes a manipulation unit 200 having, for example, keys for generating electric signals based on a user's input. The electric signals generated by the manipulation unit 200 are transmitted to the CPU 100 so that the CPU 100 may control the digital photographing apparatus according to the electric signals.

In a photographing mode, when an electric signal based on a user's input is applied to the CPU 100, the CPU 100 controls a lens driving unit 11, an iris driving unit 21, and an imaging device control unit 31 so as to respectively adjust a position of a lens unit 10, an opening degree of an iris 20, and sensitivity of an imaging device 30, in accordance with the electric signal. The imaging device 30 generates data from input light and an analog/digital (A/D) conversion unit 40 converts analog data output from the imaging device 30 into digital data. The A/D conversion unit 40 may not be included in some embodiments according to characteristics of the imaging device 30.

The data generated by the imaging device 30 may be input to a digital signal processing unit 50 through a memory 60 or may be directly input. When necessary, the data may also be input to the CPU 100. Here, examples of the memory 60 include read-only memory (ROM) and random access memory (RAM). When necessary, the digital signal processing unit 50 may perform digital signal processing such as gamma correction and white balance adjustment. Also, as shown in FIG. 3, the digital signal processing unit 50 may include components such as a similarity calculation unit 51 and a tracking area determination unit 53. However, various changes can be made to the digital signal processing unit 50. For example, the similarity calculation unit 51 and the tracking area determination unit 53 may be formed outside the digital signal processing unit 50 instead of being included in the digital signal processing unit 50. That is, any change is acceptable as long as the digital photographing apparatus according to the current embodiment includes the similarity calculation unit 51 and the tracking area determination unit 53. The similarity calculation unit 51 calculates a similarity by varying a location of a template on one frame image and the tracking area determination unit 53 determines a tracking area based on a calculation result of the similarity calculation unit 51. Operations of the similarity calculation unit 51 and the tracking area determination unit 53 will be described later in detail.

A video image of the data output from the digital signal processing unit 50 is transmitted to a display control unit 81 through the memory 60 or may be directly transmitted. The display control unit 81 controls a display unit 80 so as to display the video image on the display unit 80. The data output from the digital signal processing unit 50 is input to a storing/reading control unit 71 through the memory 60 or may be directly input. The storing/reading control unit 71 stores the data in a storage medium 70 according to a signal based on a user's input or may automatically store the data. The storing/reading control unit 71 may read data from a video file stored in the storage medium 70, and may input the data to the display control unit 81 through the memory 60 or by any other path so as to display a video image on the display unit 80. The storage medium 70 may be detachable from the digital photographing apparatus or may be permanently fixed in the digital photographing apparatus.

Operations of the similarity calculation unit 51 and the tracking area determination unit 53 will now be described with reference to FIGS. 4A, 4B, and 5A through 5E.

Figure 4A:
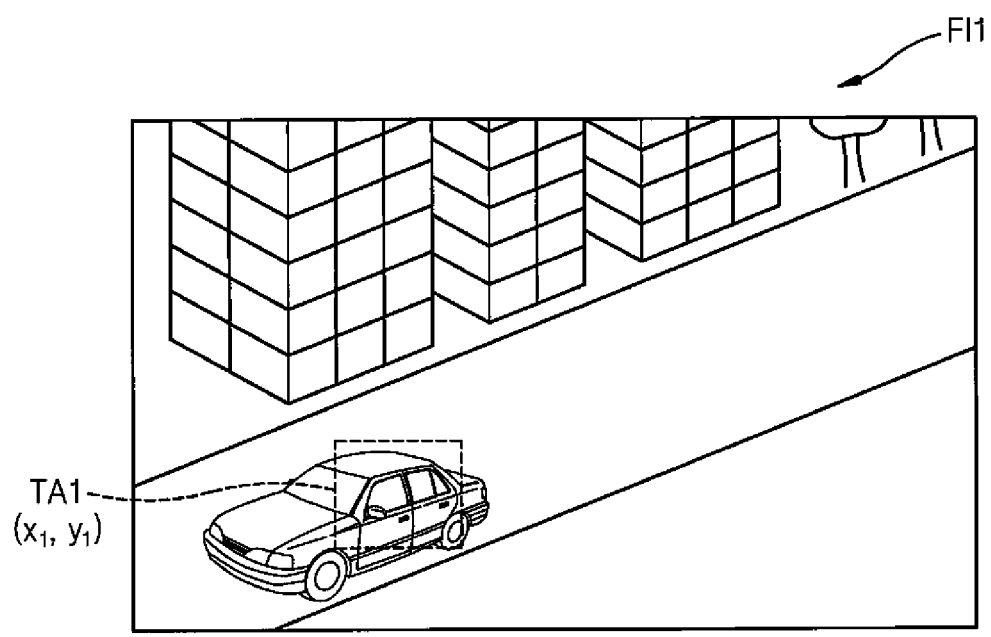
FIGS. 4A and 4B are conceptual views of first and second frame images when a target subject to be tracked moves.
Figure 4B:
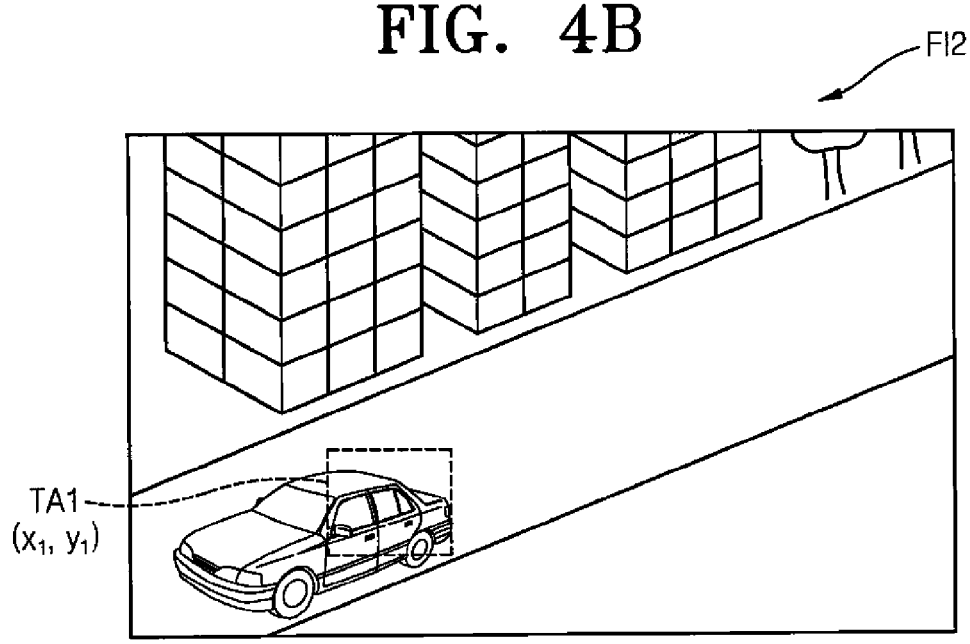

FIGS. 4A and 4B are conceptual views of first and second frame images FI1 and FI2 when a car that is a target subject to be tracked moves.

Referring to FIGS. 4A and 4B, if a location of a tracking area TA1 on the first frame image FI1 of FIG. 4A is $(x_1,y_1)$, as shown in FIG. 4B, a portion where the tracking area TA1 in the first frame image FI1 that is a previous frame image overlaps the target subject on the second frame image FI2 that is a current frame image, is different from a portion where the tracking area TA1 on the first frame image FI1 that is the previous frame image overlaps the target subject on the first frame image FI1. Thus, the tracking area needs to be updated on the second frame image FI2 that is the current frame image.

FIGS. 5A through 5E are conceptual views for describing a tracking method of the digital image processing apparatus illustrated in FIG. 2, according to an embodiment of the present invention. FIGS. 5A through 5E will be described in conjunction with FIGS. 3, 4A, and 4B.

Figure 5A:
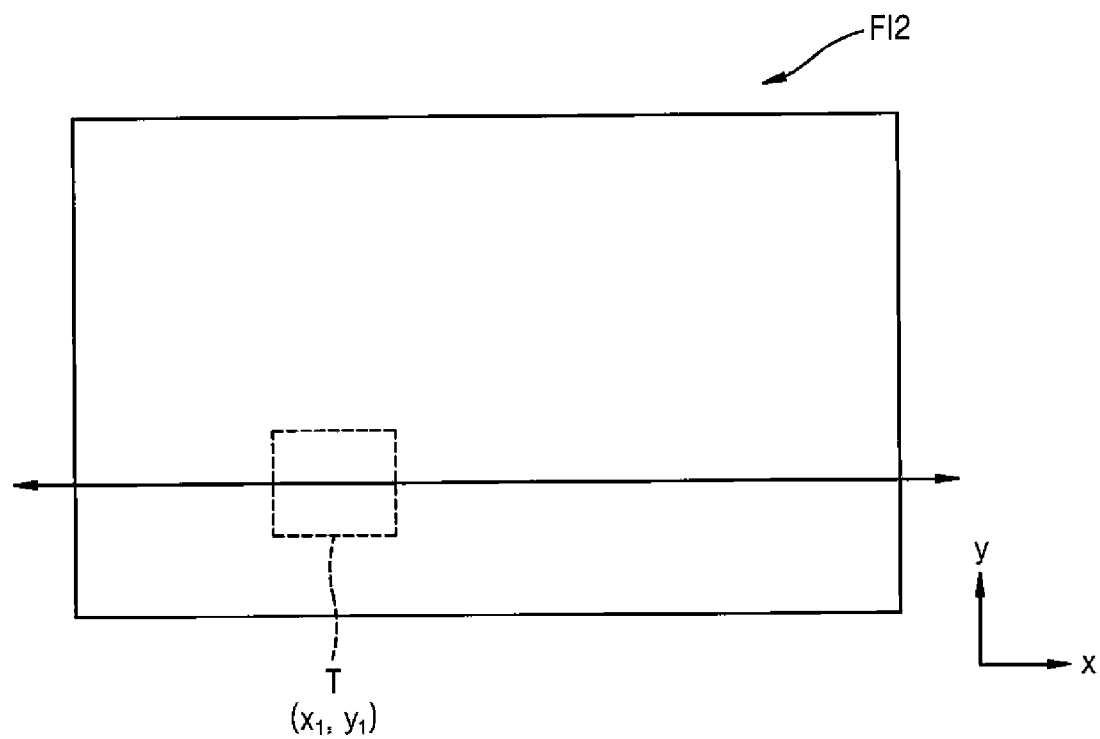
FIGS. 5A through 5E are conceptual views for describing a tracking method of the digital image processing apparatus illustrated in FIG. 2, according to an embodiment of the present invention.

Initially, a tracking area set on a previous frame image is used as a template on a current frame image. In more detail, a portion of the previous frame image, which corresponds to the tracking area set on the previous frame image, is used as a template image of the current frame image. Here, the tracking area set on the previous frame image can mean the tracking area determined on the previous frame image or, if a tracking function is initially started from the previous frame image, the tracking area that is automatically set on the previous frame image or is set by a user. FIG. 5A conceptually shows a case when the tracking area on the previous frame image is used as a template T on one frame image (the current frame image, i.e., the second frame image FI2).

The similarity calculation unit 51 calculates a second direction similarity by fixing a first direction location of the template T in a first direction (e.g., a y direction) on the second frame image FI2 and by varying a second direction location of the template T in a second direction (e.g., an x direction) that is perpendicular to the first direction. In this case, when the second direction similarity is calculated, the similarity calculation unit 51 regards a location or a neighboring location of the tracking area TA1 set on the first frame image FI1 that is the previous frame image, in the first direction (e.g., the y direction), as the first direction location of the template T in the first direction (e.g., the y direction). The first direction may be one of a horizontal direction (the x direction) and a vertical direction (the y direction) and the second direction may be the other of the horizontal direction (the x direction) and the vertical direction (the y direction). Here, similarity calculation refers to calculating a similarity between the template image and a portion of the second frame image FI2, which is the same size as the template T. If a difference between the template image and a portion of the second frame image FI2, which is the same size as the template T, is small, the similarity is high. For example, if data at a pixel (x,y) of the template T is T(x,y) and data at the pixel (x,y) of a portion of the second frame image FI2, which corresponds to the template T, is FI(x,y), Error=Σ|T(x,y)−FI(x,y)| may be calculated and the similarity may be determined to be high when a calculated value is small.

Figure 5B:
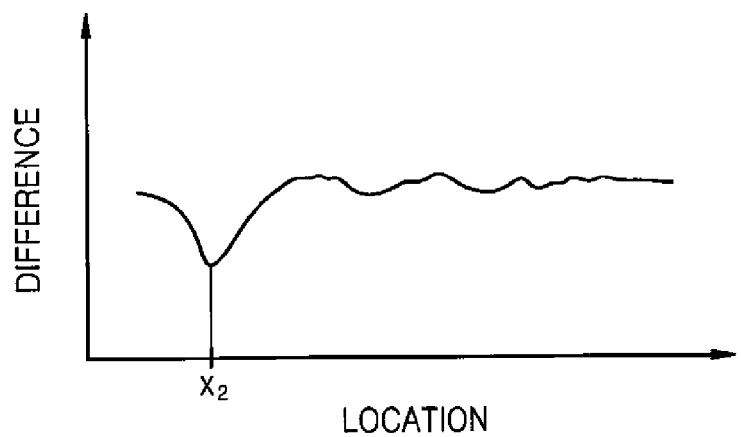

As such, the second direction similarity is calculated and the calculated second direction similarity can be represented in a graph of difference versus location as shown in FIG. 5B. In FIG. 5B, the highest similarity (the smallest difference) occurs at a second direction location $x_2$. Generally, locations of a target subject to be tracked are similar in two neighboring frame images because the target subject cannot instantaneously move between two places that are relatively far from one another. Thus, if the first direction location of the template T in the first direction (e.g., the y direction) on the second frame image FI2 is fixed and the second direction location of the template T in a second direction (e.g., the x direction) that is perpendicular to the first direction is varied, as shown in FIG. 5B, near the location $(x_1,y_1)$ of the tracking area TA1 on the first frame image FI1 that is the previous frame image, the similarity between the template T and a corresponding portion of the second frame image FI2 is higher than the similarity between the template T and other portions of the second frame image FI2.

Figure 5C:
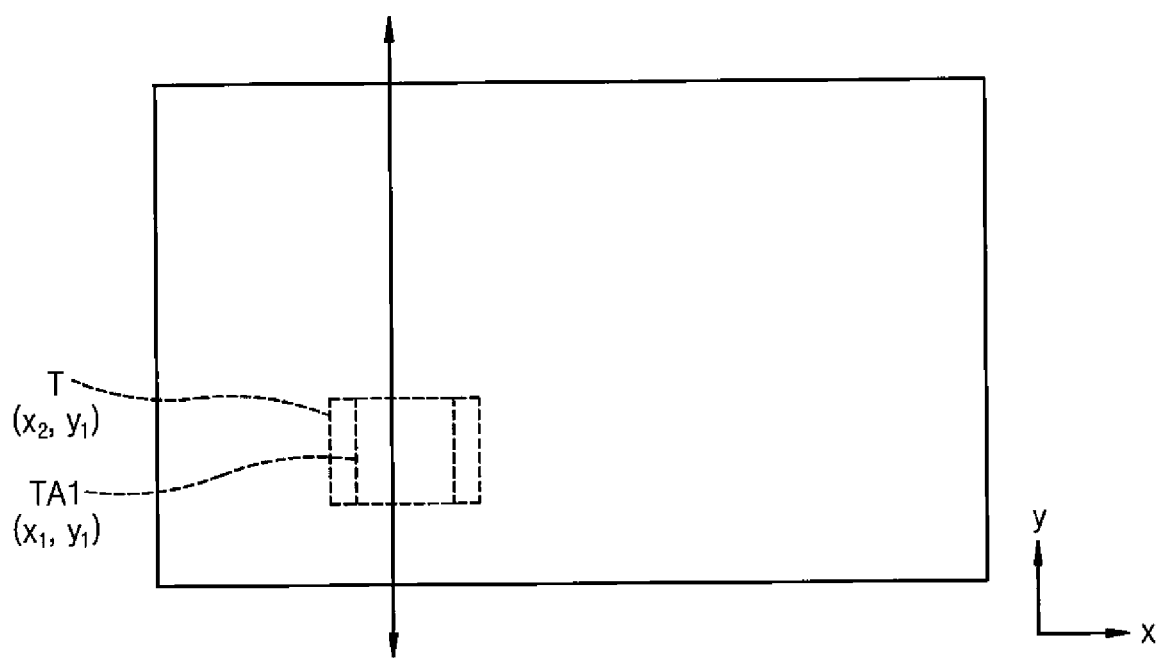

FIG. 5C conceptually shows the location $(x_1,y_1)$ of the tracking area TA1 on the first frame image FI1 and the template T indicated at a location $(x_2,y_1)$ where the second direction similarity is determined to be the highest by performing the above process. Here, only a location of the template T is varied and the template image is identical to a portion corresponding to the tracking area TA1 on the first frame image FI1 that is the previous frame image, from among portions of the first frame image FI1.

Figure 5D:
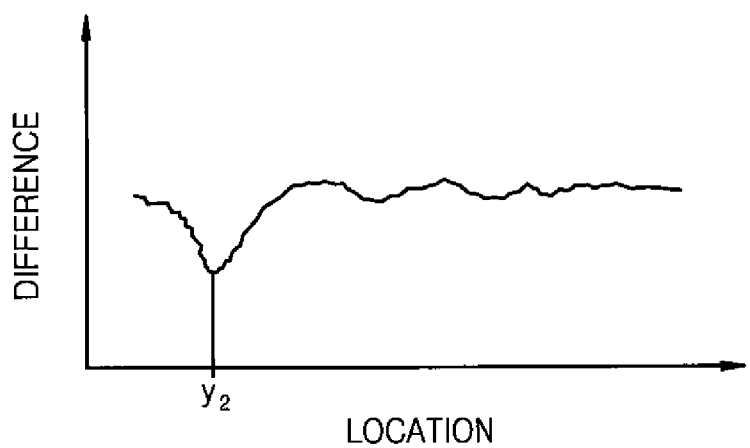

Then, the similarity calculation unit 51 calculates a first direction similarity by fixing the second direction location (e.g., a location in the x direction) of the template T at the location $(x_2,y_1)$ where the second direction similarity is the highest and by varying the first direction location of the template T in the first direction (e.g., the y direction) on the second frame image FI2, as shown in FIG. 5C. In this case, as shown in FIG. 5D, near the location $(x_1,y_1)$ of the tracking area TA1 on the first frame image FI1 that is the previous frame image, the similarity between the template T and a corresponding portion of the second frame image FI2 is higher than the similarity between the template T and other portions of the second frame image FI2. In FIG. 5D, the highest similarity (the smallest difference) occurs at a first direction location $y_2$.

Figure 5E:
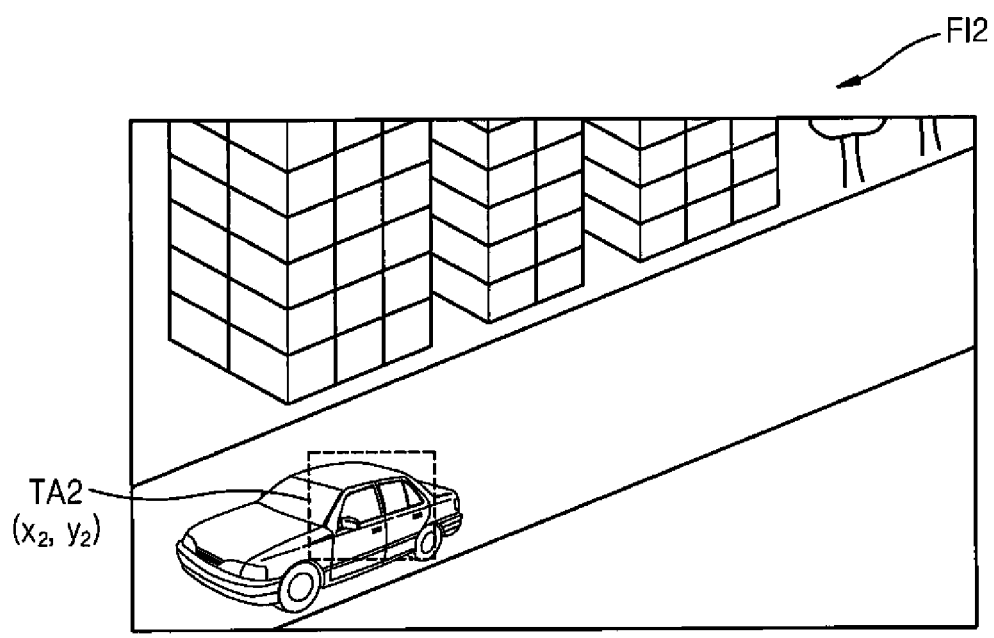

As such, as shown in FIG. 5E, the tracking area determination unit 53 determines a portion of the second frame image FI2, which is most similar to the template T, as a tracking area TA2 based on a calculation result of the similarity calculation unit 51. In the above case, a portion corresponding to a location $(x_2,y_2)$ may be determined as the tracking area TA2 on the second frame image FI2. That is, the tracking area determination unit 53 determines a location where the first direction similarity is the highest (location $(x_2,y_2)$) as a location of the tracking area TA2 on the second frame image FI2. Here, a location of a template and/or a location of a tracking area refer to, for example, a center of the template and/or a center of the tracking area. However, various changes can be made to the location of the template and/or the location of the tracking area. For example, the location of the template and/or the location of the tracking area may refer to a top left of the template and/or a top left of the tracking area. The determined tracking area TA2 is the same size as the template T.

As described above, for example, if one frame image has a size of 320×240 and a template has a size of 80×60, according to a conventional digital image processing apparatus, a similarity calculation should be performed a total of 43621 times in order to find a portion of the one frame image, which is most similar to the template. Thus, a tracking area cannot be easily determined. However, in a digital image processing apparatus according to the current embodiment, the similarity calculation is performed 241 times (241=320−80+1) in order to calculate a first direction similarity and then is performed 181 times (181=240−60+1) in order to calculate a second direction similarity. Ultimately, the tracking area may be accurately determined by performing the similarity calculation a total of 422 times. Thus, in comparison to the conventional digital image processing apparatus, the tracking area may be efficiently, rapidly, and accurately tracked such that the digital image processing apparatus does not require high specification hardware, thereby greatly reducing manufacturing costs.

Figure 6:
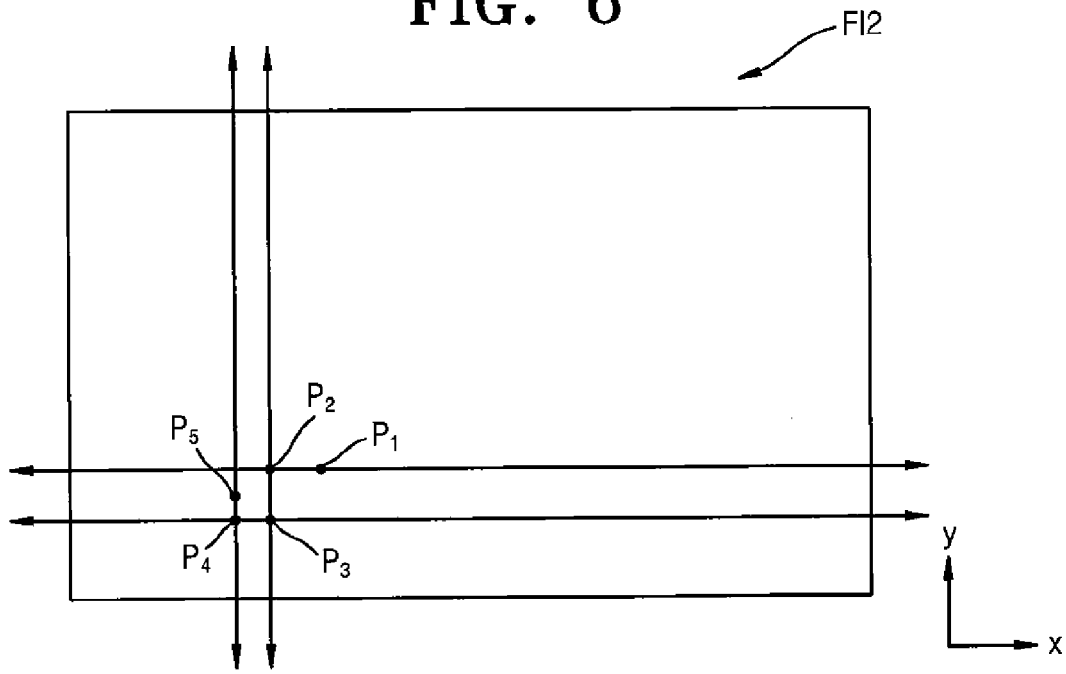
FIG. 6 is a conceptual view for describing a tracking method of the digital image processing apparatus illustrated in FIG. 2, according to another embodiment of the present invention.

FIG. 6 is a conceptual view for describing a tracking method of the digital image processing apparatus illustrated in FIG. 2, according to another embodiment of the present invention. FIG. 6 will be described in conjunction with FIG. 3.

Referring to FIG. 6, the similarity calculation unit 51 may repeatedly calculate a second direction similarity and a first direction similarity a plurality of times and the tracking area determination unit 53 may determine a tracking area based on a repeated calculation result. In FIG. 6, each of the second direction similarity and the first direction similarity is calculated twice.

In more detail, as described above with reference to FIGS. 5A through 5E, the second direction similarity is calculated by fixing a first direction location of a template in a first direction (e.g., a y direction) on a second frame image FI2 and by varying a second direction location of the template in a second direction (e.g., an x direction) that is perpendicular to the first direction. In FIG. 6, $P_1$ is a location of the tracking area set on a previous frame image and $P_2$ is a location where the second direction similarity is determined to be the highest. Then, the first direction similarity is calculated by fixing the second direction location of the template at the location $P_2$ where the second direction similarity is the highest and by varying the first direction location of the template in the first direction (e.g., the y direction) on the second frame image FI2. $P_3$ is a location where the first direction similarity is determined to be the highest. Although the location $P_3$ is determined as a location of the tracking area on the second frame image FI2 in the previous embodiment described above with reference to FIGS. 5A through 5E, according to the current embodiment, a similarity calculation is further performed so that more accurate tracking may be performed on the tracking area.

In more detail, after the second direction similarity and the first direction similarity are calculated, the similarity calculation unit 51 re-calculates the second direction similarity by fixing the first direction location of the template at the location $P_3$ where the first direction similarity is the highest and by varying the second direction location of the template in the second direction (e.g., the x direction) on the second frame image FI2. $P_4$ is a location where the re-calculated second direction similarity is determined to be the highest. Thus, the location $P_4$ represents a more accurate location of the tracking area than the location $P_3$.

Figure 1:
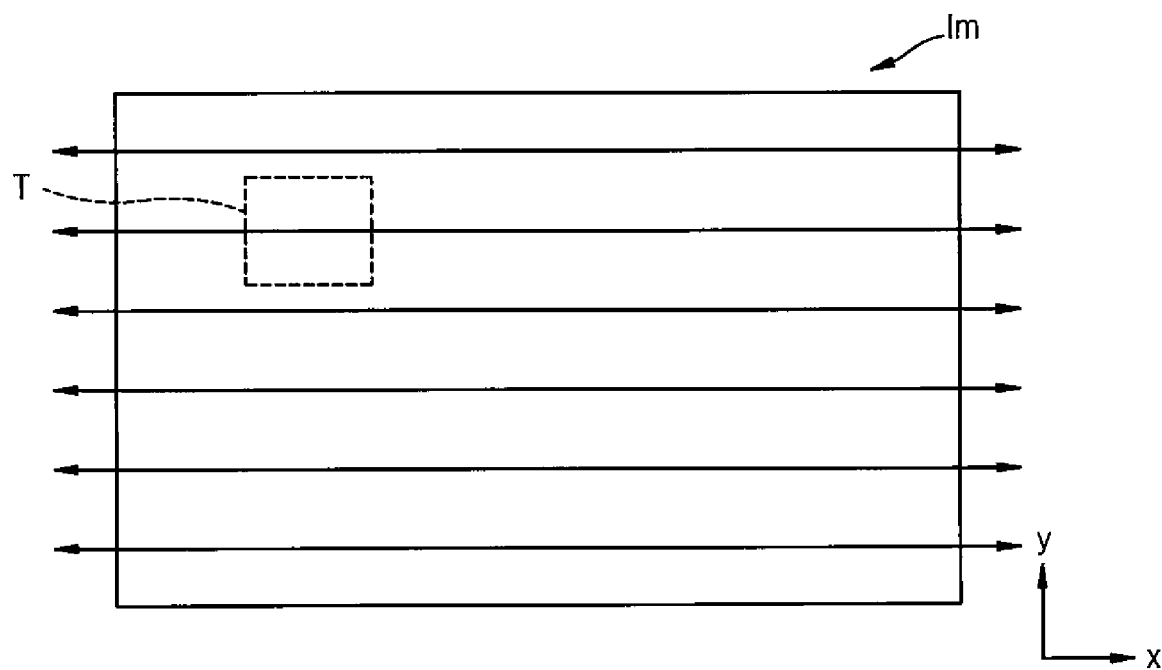
FIG. 1 is a conceptual view for describing a tracking method of a conventional digital image processing apparatus.

Then, after the second direction similarity is re-calculated, the similarity calculation unit 51 may re-calculate the first direction similarity by fixing the second direction location of the template at the location $P_4$ where the second direction similarity is the highest and by varying the first direction location of the template in the first direction (e.g., the y direction) on the second frame image FI2. $P_5$ is a location where the re-calculated first direction similarity is determined to be the highest. Thus, the location $P_5$ represents a more accurate location of the tracking area than the location $P_4$. The above process only requires the similarity calculation to be performed a total of 844 times (844=422×2). Accordingly, in comparison to the conventional digital image processing apparatus illustrated in FIG. 1, which requires the similarity calculation to be performed a total of 43621 times, the number of times the similarity calculation is required to be performed may be greatly reduced and the tracking area may be accurately tracked.

Figure 7:
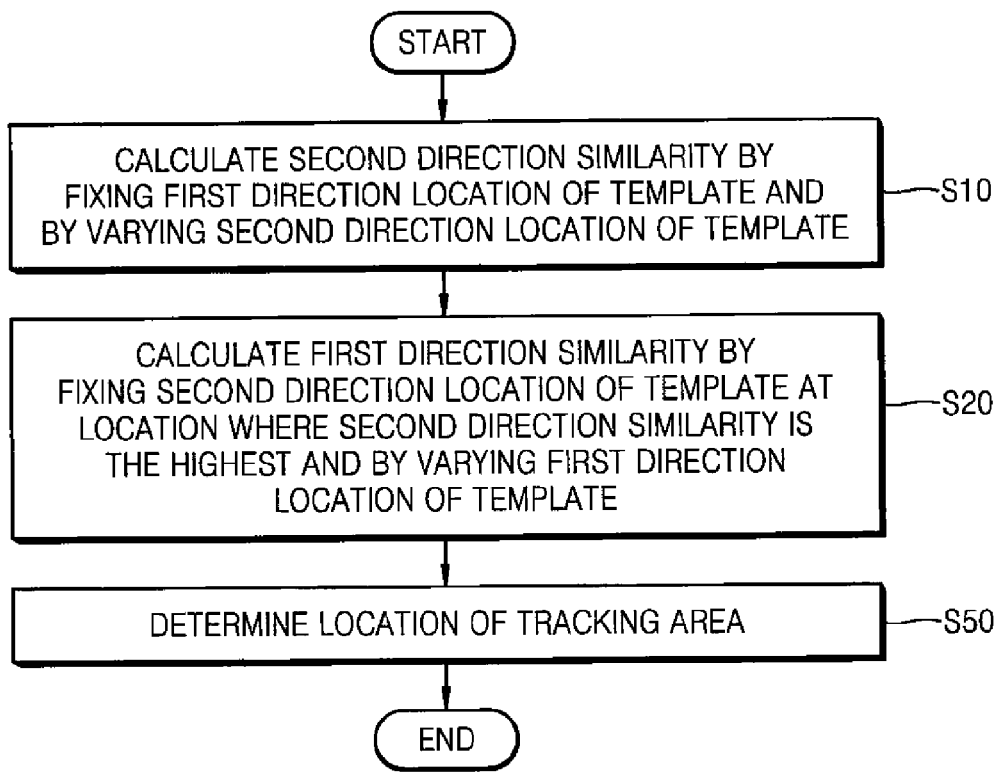
FIG. 7 is a flowchart of a method of controlling a digital image processing apparatus, according to an embodiment of the present invention.

FIG. 7 is a flowchart of a method of controlling a digital image processing apparatus, according to an embodiment of the present invention.

Referring to FIG. 7, initially, a tracking area set on a previous frame image is regarded as a template on a current frame image, a location or a neighboring location of the tracking area in a first direction on the previous frame image is regarded as a first direction location of the template in the first direction, and a second direction similarity is calculated by fixing the first direction location of the template and by varying a second direction location of the template in a second direction that is perpendicular to the first direction, in operation S10. Then, a first direction similarity is calculated by fixing the second direction location of the template at a location where the second direction similarity is the highest, which is determined in operation S10, and by varying the first direction location of the template in the first direction on the current frame image, in operation S20. As such, the tracking area on the current frame image is determined in operation S50. In more detail, a location where the first and second direction similarities are the highest is determined as a location of the tracking area. Thus, in comparison to a conventional digital image processing apparatus, the number of times a calculation is performed may be greatly reduced and the tracking area may be rapidly and accurately tracked.

Figure 8:
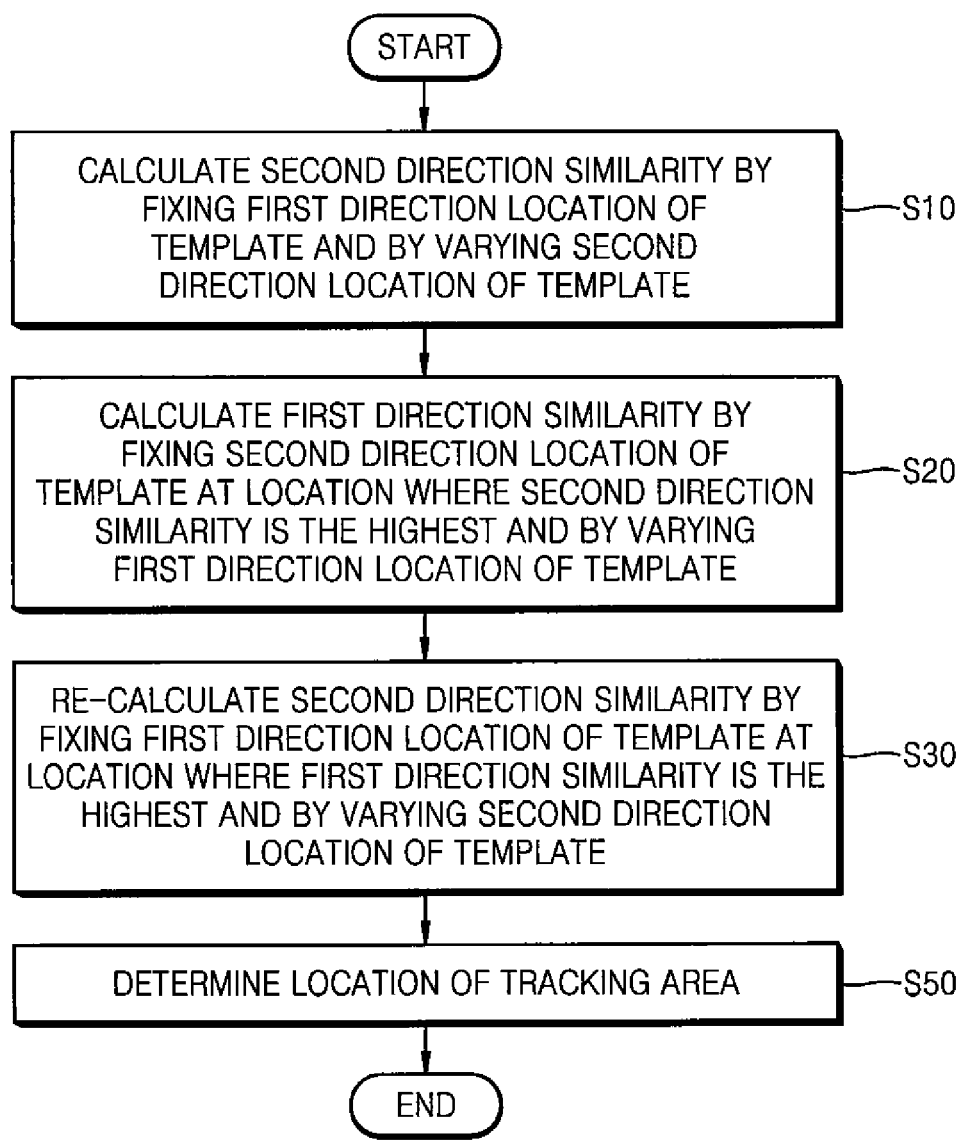
FIG. 8 is a flowchart of a method of controlling a digital image processing apparatus, according to another embodiment of the present invention.

FIG. 8 is a flowchart of a method of controlling a digital image processing apparatus, according to another embodiment of the present invention.

Referring to FIG. 8, the method according to the current embodiment is different from the method according to the previous embodiment of FIG. 7 in that, after operation S20, the second direction similarity is re-calculated by fixing the first direction location of the template at a location where the first direction similarity is the highest, which is determined in operation S20, and by varying the second direction location of the template in the second direction on the current frame image, in operation S30. As such, a location where the second direction similarity is the highest, which is determined in operation S30, is determined as a location of the tracking area on the current frame image. Thus, more accurate tracking may be performed on the tracking area.

Figure 9:
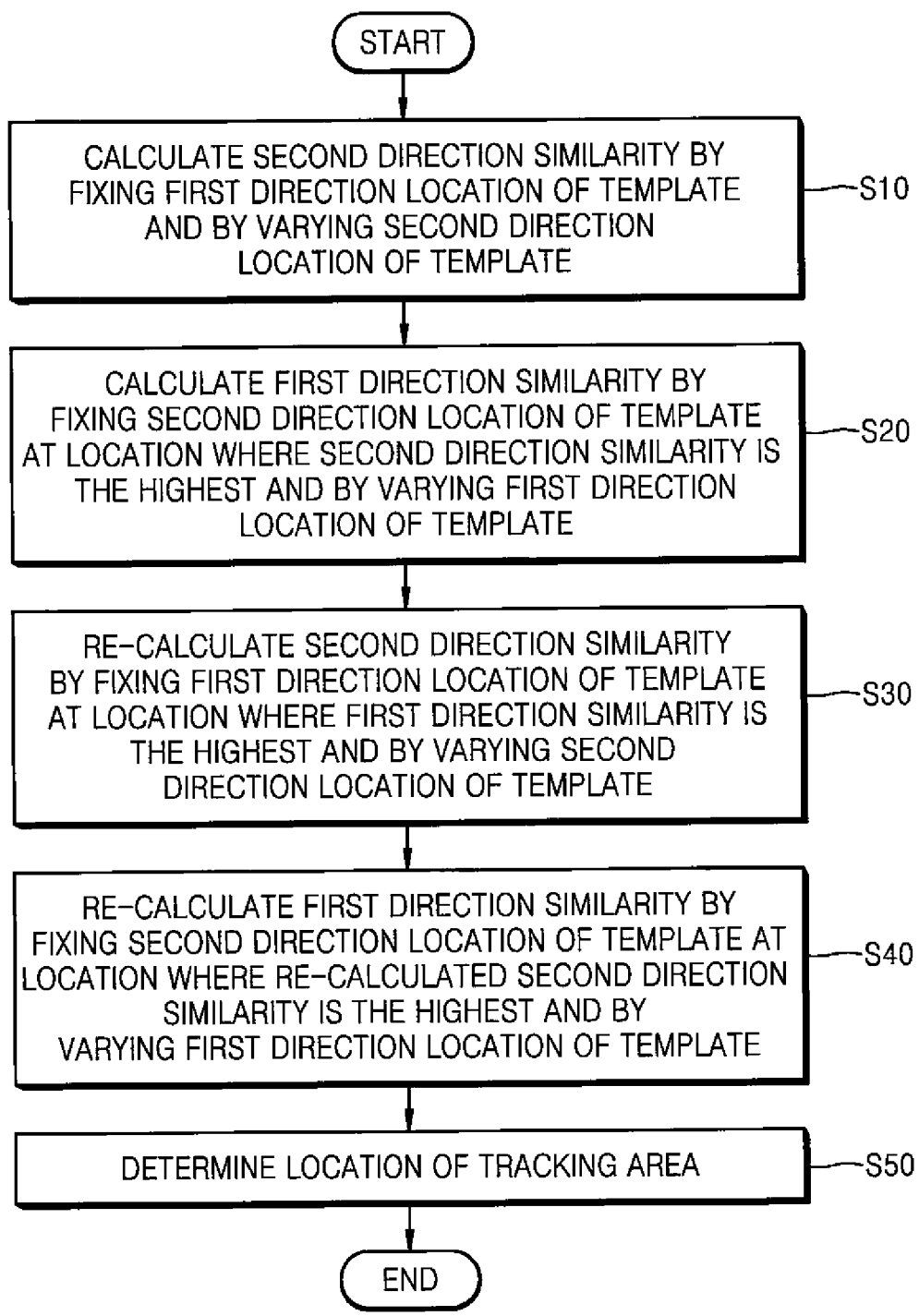
FIG. 9 is a flowchart of a method of controlling a digital image processing apparatus, according to another embodiment of the present invention.

FIG. 9 is a flowchart of a method of controlling a digital image processing apparatus, according to another embodiment of the present invention.

Referring to FIG. 9, after operation S30, the first direction similarity is re-calculated by fixing the second direction location of the template at a location where the second direction similarity is the highest, which is determined in operation S30, and by varying the first direction location of the template in the first direction on the current frame image, in operation S40. As such, even more accurate tracking may be performed on the tracking area. In this case, a location where the first direction similarity is the highest, which is determined in operation S40, is determined as a location of the tracking area on the current frame image.

Meanwhile, in the above embodiments of FIGS. 7 through 9, the tracking area is the same size as the template, the first direction may be one of horizontal and vertical directions, and the second direction may be the other of the horizontal and vertical directions.

A program for executing a method of controlling a digital image processing apparatus according to the aforementioned embodiments or modifications thereof may be stored in a computer-readable storage medium. The storage medium may include the memory 60 or storage medium 70 as illustrated in FIG. 2. Examples of the storage medium include magnetic storage media (e.g., floppy disks, hard disks, or magnetic tape), optical recording media (e.g., CD-ROMs or digital versatile disks (DVDs)), and electronic storage media (e.g., integrated circuits (IC's), ROM, RAM, EEPROM, or flash memory).

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. It will be recognized that the terms "comprising," "including," and "having," as used herein, are specifically intended to be read as open-ended terms of art.

What is claimed is:

1. A digital image processing apparatus having a tracking function for tracking a location variation of a set tracking area on a plurality of frame images, the apparatus comprising:
    a processor comprising a similarity calculation unit having a frame image input, a template input, and a similarity output, the similarity calculation unit configured to calculate the similarity output by:
        (a) varying a location of a template on one frame image, wherein the similarity calculation unit
            (i) calculates a second direction similarity by holding a first direction location of the template constant in a first direction on the one frame image and
            varying a second direction location of the template in a second direction on the one frame image, the second direction being perpendicular to the first direction, and
            (ii) then calculates a first direction similarity by holding the second direction location of the template constant at a location where the second direction similarity is the highest and
            varying the first direction location of the template in the first direction on the one frame image; and
        (b) outputting the first direction similarity and the second direction similarity via the similarity output.

2. The apparatus of claim 1, wherein the template on the one frame image is a tracking area set on a previous frame image.

3. The apparatus of claim 2, wherein, when the second direction similarity is calculated, the similarity calculation unit regards a location or a neighboring location of the tracking area set on the previous frame image, in the first direction, as the first direction location of the template in the first direction.

4. The apparatus of claim 1, further comprising a tracking area determination unit having a similarity input and a tracking area output, the tracking area determination unit configured to determine a portion of the one frame image which is most similar to the template as the tracking area based on a calculation result of the similarity calculation unit received via the similarity input, and output the determined portion as the tracking area.

5. The apparatus of claim 4, wherein the tracking area is the same size as the template.

6. The apparatus of claim 4, wherein the tracking area determination unit determines a location where the first direction similarity is the highest as a location of the tracking area on the one frame image.

7. The apparatus of claim 6, wherein the tracking area is the same size as the template.

8. The apparatus of claim 1, wherein, after the second direction similarity and the first direction similarity are calculated, the similarity calculation unit re-calculates the second direction similarity by holding the first direction location of the template constant at a location where the first direction similarity is the highest and by varying the second direction location of the template in the second direction on the one frame image.

9. The apparatus of claim 8, wherein, after the second direction similarity is re-calculated, the similarity calculation unit re-calculates the first direction similarity by holding the second direction location of the template constant at a location where the re-calculated second direction similarity is the highest and by varying the first direction location of the template in the first direction on the one frame image.

10. The apparatus of claim 1, wherein the similarity calculation unit repeatedly calculates the second direction similarity and the first direction similarity a plurality of times.

11. The apparatus of claim 1, wherein the first direction is one of horizontal and vertical directions and the second direction is the other of the horizontal and vertical directions.

12. A method of controlling a digital image processing apparatus, the method comprising:
    (a) calculating a second direction similarity by regarding a tracking area set on a previous frame image as a template on a current frame image, regarding a location or a neighboring location of the tracking area in a first direction on the previous frame image as a first direction location of the template in the first direction, holding the first direction location of the template constant, varying a second direction location of the template in a second direction which is perpendicular to the first direction; and
    (b) calculating a first direction similarity by holding the second direction location of the template constant at a location where the second direction similarity is the highest, which is determined in (a), and by varying the first direction location of the template in the first direction on the current frame image.

13. The method of claim 12, further comprising (c) determining a location where the first direction similarity is the highest, which is determined in (b), as a location of the tracking area on the current frame image.

14. The method of claim 13, wherein the tracking area is the same size as the template.

15. The method of claim 12, further comprising (c) re-calculating the second direction similarity by holding the first direction location of the template constant at a location where the first direction similarity is the highest, which is determined in (b), and by varying the second direction location of the template in the second direction on the current frame image.

16. The method of claim 15, further comprising (d) determining a location where the second direction similarity is the highest, which is determined in (c), as a location of the tracking area on the current frame image.

17. The method of claim 16, wherein the tracking area is the same size as the template.

18. The method of claim 15, further comprising (d) re-calculating the first direction similarity by holding the second direction location of the template constant at a location where the second direction similarity is the highest, which is determined in (c), and by varying the first direction location of the template in the first direction on the current frame image.

19. The method of claim 18, further comprising (e) determining a location where the first direction similarity is the highest, which is determined in (d), as a location of the tracking area on the current frame image.

20. The method of claim 19, wherein the tracking area is the same size as the template.

21. The method of claim 12, wherein the first direction is one of horizontal and vertical directions and the second direction is the other of the horizontal and vertical directions.

22. A non-transitory computer readable storage medium having stored thereon a program executable by a processor for performing a method, the method comprising:
  (a) calculating a second direction similarity by regarding a tracking area set on a previous frame image as a template on a current frame image, regarding a location or a neighboring location of the tracking area in a first direction on the previous frame image as a first direction location of the template in the first direction, holding the first direction location of the template constant, varying a second direction location of the template in a second direction which is perpendicular to the first direction; and
  (b) calculating a first direction similarity by holding the second direction location of the template constant at a location where the second direction similarity is the highest, which is determined in (a), and by varying the first direction location of the template in the first direction on the current frame image.

* * * * *

UNITED STATES PATENT AND TRADEMARK OFFICE
CERTIFICATE OF CORRECTION

PATENT NO. : 8,538,073 B2  
APPLICATION NO. : 12/622620  
DATED : September 17, 2013  
INVENTOR(S) : Soon-geun Jang and Eun-sun Ahn Page 1 of 1

It is certified that error appears in the above-identified patent and that said Letters Patent is hereby corrected as shown below:

ON THE TITLE PAGE:

In (73) Assignee, replace "Samsung Electroncis Co., Ltd." with --Samsung Electronics Co., Ltd.--

Signed and Sealed this
Tenth Day of December, 2013

Margaret A. Focarino
*Commissioner for Patents of the United States Patent and Trademark Office*